Patented Oct. 2, 1951

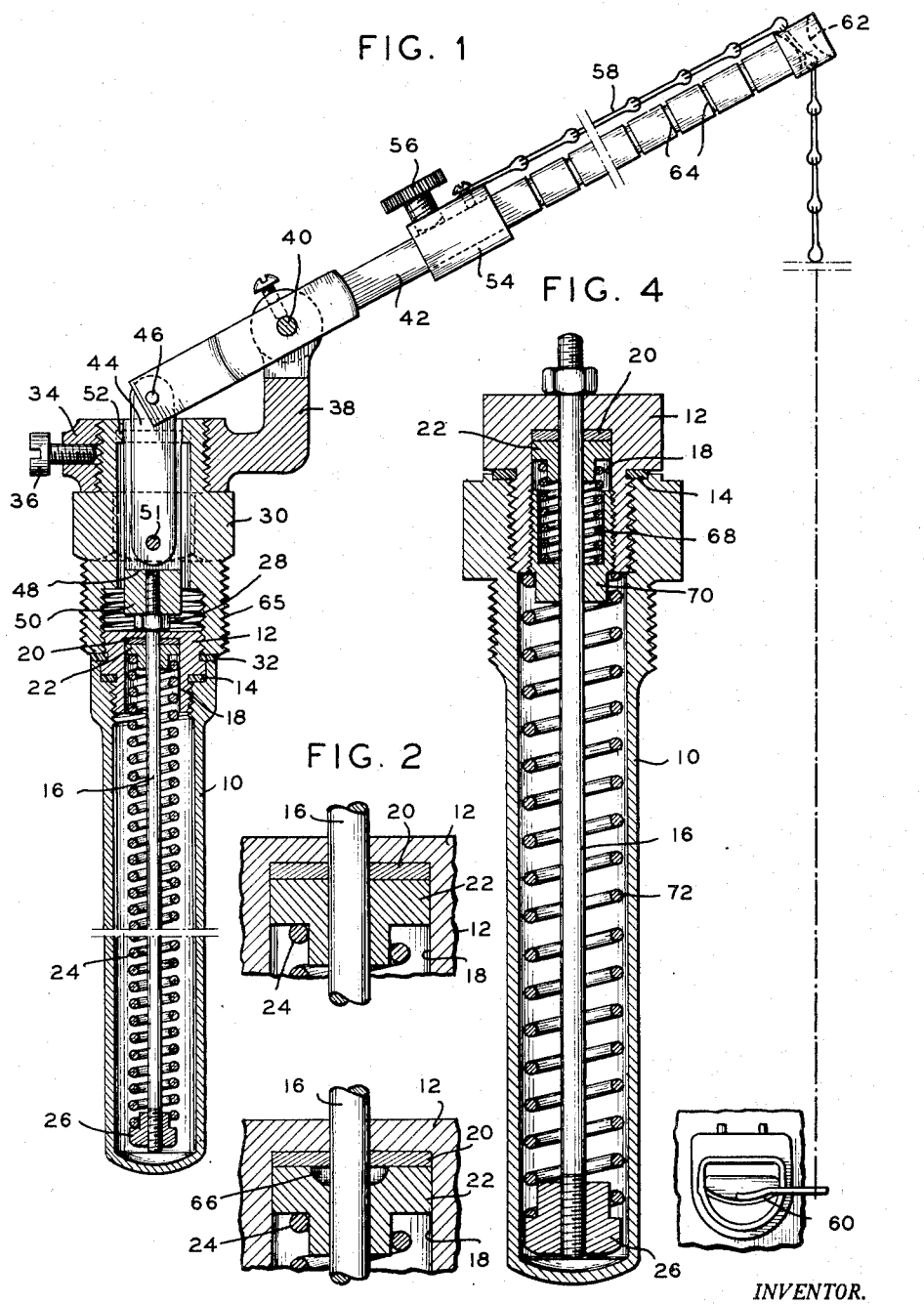

2,570,098

UNITED STATES PATENT OFFICE 2,570,098

FLUID EXPANSION THERMOSTAT

Ragnar Carlstedt, Stockholm, Sweden

Application July 21, 1948, Serial No. 39,873
In Sweden November 19, 1943

3 Claims. (Cl. 297—6)

My invention relates to thermostats having for their object to keep the temperature of a body or a fluid at a certain level or levels. As examples of the range of applications for thermostats of this type may be mentioned refrigerators, boilers for central heating systems, motor radiators and tapping devices for water of condensation.

According to an earlier disclosure by applicant, the thermostat is formed with a receptacle filled with an expansible liquid, said receptacle receiving a rod of a comparatively small diameter. This rod or plunger-like member extends through the wall of the receptacle, and is tightened against the latter by means of a packing. Depending on the temperature of the liquid the rod will take different positions relative to the receptacle and will in turn actuate a controlling member. A thermostat of this type offers, among other things, the advantage that upon a change in temperature the total change in volume of the liquid acts upon the narrow rod or plunger, so that the displacement of the latter is relatively great. However, it has not been possible hitherto to make any practical use of such thermostats because of the difficulties met with in providing sufficient tightness in such packing. The demands on the sealing effect are understood to be exceptionally high, inasmuch as even a very minor leakage results in the controlling action of the thermostat becoming incorrect. The volume of liquid enclosed within the receptacle may frequently amount to a few cubic centimeters only, and consequently a leakage of even a few drops makes the thermostat unreliable. It is also to be taken into consideration that a thermostat must function for a long period of time, during which the rod moves relative to the packing upon variations in the temperature so as to subject the packing to a certain effect. On a rise of the temperature, the pressure may assume high values in the receptacle, which the packing must be capable of resisting without a trace of leakage.

It is the object of this invention to solve the tightening problem of thermostats of this special type in an entirely satisfactory manner, which has also been corroborated by extensive tests.

Further objects and advantages of the invention will be apparent from the following description considered in connection with the accompanying drawing, which forms a part of this specification, and of which:

Fig. 1 is a side view, in part in longitudinal section, of a thermostat, adapted for the boiler of a central heating system.

Fig. 2 is a sectional view of a part of Fig. 1 but on an enlarged scale.

Fig. 3 is a longitudinal sectional view of a part of a thermostat according to a modified embodiment of the invention.

Fig. 4 is a longitudinal sectional view of a further embodiment of my invention.

In the Figs. 1 and 2, 10 designates a tubular receptacle of circular cross section, the walls of which are of a thickness and of a material so as to resist, without being subjected to deformation, the very high pressures that frequently occur in the receptacle. The bottom of the receptacle may be made bowl-shaped to resist said pressures above atmospheric without any deformation. Threaded into the opening of the receptacle 10 is a member 12, a packing 14 being inserted between said parts, which packing preferably has the form of an aluminum ring.

A rod or plunger 16 enters a bore of the member 12 with a sliding fit and extends into the receptacle, the diameter of the rod being considerably smaller than the internal diameter of the receptacle. This bore is of such a length as to serve as a guideway for the rod. Thus all friction is avoided between the cylindrical internal wall of the receptacle and the movable parts housed therein. The cylindrical rod 16 is preferably made of brass and has a chromed surface.

The member 12 is provided, on the side thereof facing the interior of the receptacle, with a cylindrical recess 18, the bottom portion of which extends at right angles to the longitudinal axis of the thermostat, a packing 20 of synthetic rubber being inserted into said recess. This packing fills the cross section of the recess 18 and has itself an internal diameter which is somewhat smaller than the external diameter of the rod 16. Furthermore, the packing 20 is flat and has a thickness less than two millimeters. An annular element or stopper 22 is disposed in the recess 18 and has a central bore for the rod 16 extending therethrough. This stopper has a small play toward the cylindrical wall of the recess 18 as well as toward the rod 16. The surface of the stopper 22 facing the packing 20 extends at right angles to the longitudinal axis of the thermostat and merges, like the bottom surface of the recess 18, into the central bore by a sharp edge to prevent the packing from being jammed between the rod and the respective bores when the rod is moving in the one or the other direction. The packing 20 is constantly under a comparatively powerful pressure, from at least one spring 24, which is thrust onto the rod 16 and adapted to bear against an abutment 26 on the end portion of the rod and against the stopper 22 under initial tension. This initial tension may be provided or adjusted by threading a nut 28 onto the portion of the rod 16 projecting outside the member 12 and by tightening this nut against the member when the thermostat is assembled. The receptacle is filled with a liquid having a high coefficient of expansion, such as petroleum.

A sleeve 30 is threaded on the member 12 into contact with a packing ring 32, which is disposed between the sleeve and the tubular member 10. On the upper portion of the sleeve 30 a ring 34 is threaded, which is secured in position by a screw 36. Said ring has a bifurcated projection 38, carrying a pin 40, on which a lever 42 is pivoted. A link 44 is pivoted on a pin 46 provided at one end of the lever 42. The link 44 enters the sleeve 30 as well as a longitudinal slot 48 in a cylindrical member 50 and is pivoted at its lower end on a pin 51 carried by said member. The latter is threaded on the upper end of the rod 16 and is guided against lateral movement by the sleeve 30, which has an upper bore portion 52 of corresponding shape for that purpose. The link 44 is narrower than the bore portion 52, as appears from Fig. 1, so that the link is allowed to pivot on the pin 51 when the angular position of the lever 42 is changed.

A sleeve member 54 is adapted to slide on the lever 42 on that part of the lever which is remote from the pin 46, a screw 56 serving to secure said member in any desired position. A chain 58 is attached to the member 54 and the draught check plate 60 of the heating boiler, and passes through a hole 62 at the free end of the lever 42. The initial position of said plate is adjusted by the members 54 and 56, markings 64 at spaced intervals being preferably provided on the lever 42 to facilitate such adjustment according to the demand of heat delivered by the boiler.

The tubular member 10 is intended to enter the water space of the heating boiler, which has a hole (not shown) engaged by the threads 65 of the sleeve 30.

When in operation the thermostat being subjected to a rise in temperature, and the liquid therein thus being caused to expand, the rod 16 will be forced a certain distance out of the thermostat, so that the volume of the rod portion projecting outside the thermostat will be equal to the increase in the volume of the liquid. The portion of the rod 16 projecting from the thermostat will then actuate the plate or damper 60 through the members 44, 42 and 58, so that the air supply to the boiler is throttled. The movement of the rod per degree of the temperature rise will be great and may be given any desired value by adapting the diameter of the rod in relation to the liquid volume of the receptacle.

The packing 20 is pressed by the pressure of the spring 24, against the rod 16 as well as against the walls of the recess 18, so that a fully fluid-tight sealing is obtained even if very high pressures occur in the receptacle 10 at a rise of the temperature, when the rod 16 is to actuate the regulating device. The regulating power is very great. On the other hand, if the rod 16 is pulled outwardly for some reason or other, so that a vacuum is produced within the receptacle 10, the packing 20 will prevent any leakage of air into the receptacle. The return of the rod 16 into the receptacle 10 upon a fall in temperature is facilitated by the spring 24 and may be effected solely by the latter.

In the embodiment according to Fig. 3, in which as well as in Fig. 4, the same reference characters are used as in Fig. 1 for equivalent parts, the stopper 22 has an annular recess 66 at its central and upper part which faces the packing 20. Consequently, the contact surfaces between the packing and the stopper are spaced from the rod 16. When there is a pressure above atmospheric in the interior of the tubular member 10 the liquid in the same acts on the free central surface of the packing 20 and ensures together with the forces including an inwardly acting component, which the spring 24 exercises on the packing, an absolute seal. If on the contrary the pressure above atmospheric ceases, as is the case when the temperature of the liquid in the thermostat falls, the packing 20 tends to bend downwardly in the recess 23 during the return movement of the rod 16 into the tubular member 10. Such movement thus takes place against relatively small resistance. The spring 24 may as a consequence be made weaker to a corresponding degree.

In the embodiment according to Fig. 4 the packing 20 is under pressure from an initial tension spring 68 disposed between the stopper 22 and the bottom of a sleeve 70 threaded into the recess 18. The initial tension of the spring 68 may be adjusted by threading the sleeve 70 a different distance into the recess. A spring 72, which is longer and stronger than the spring 68, is provided around the rod 16 between the member 12 and the abutment 26. While the latter spring serves to retract the rod 16 into the tubular member 10, when the temperature of the liquid therein is falling, the spring 68 has as its only function to secure the perfect sealing of the packing 20. The sealing pressure actuated by said spring will be constant.

A thermostat of the construction above described may be used at lower temperatures, that is temperatures below 0° C., the liquid, such as petroleum, being placed in the member 20 in liquid state at a temperature which is lower than the lowest temperature during operation of the thermostat. However, I have discovered that the thermostat according to the invention is capable of maintaining an absolute seal between the rod 16 and the packing 20 even if it contains a liquid which in operation solidifies with accompanying expansion in the volume, as is the case with water. At a predetermined temperature, such as for controlling the supply of cooling medium to the evaporator of a refrigerating machine, a large displacement of the rod takes place more or less momentarily, which among other things simplifies the construction of the control devices to a high degree. If the thermostat liquid consists of water any desired controlling temperature may be obtained by mixing a substance or a liquid, such as alcohol, with the water which lowers its freezing point. The liquid such as water may be placed in the thermostat at a higher temperature than the operating temperature of the thermostat so that a vacuum will exist in the tubular member 10, as long as the liquid is in liquid state. Consequently, the rod will be stationary until the liquid freezes.

While several more or less specific embodiments of the invention have been shown, it is to be understood that this is for purpose of illustration only, and the invention is not to be limited

What I claim is:

1. A thermostat comprising a receptacle filled with an expansible fluid, a rod in said receptacle, said rod being of comparatively small cross-section relative to that of said receptacle and extending through a wall of said receptacle, a circumferentially continuous annular packing of elastic material surrounding said rod and disposed in contact with the bottom of a recess in said wall, an axially displaceable annular element in said recess in contact with said packing, the bottom of the recess and the surface of the element contacting the packing extending in planes perpendicular to the axis of the rod, and a spring acting on said element to exert compressive pressure on said packing irrespective of the axial position of said rod for effecting a fluid-tight seal between said packing, said bottom and said rod, the face of said annular element on the side thereof facing the packing being provided with a recess extending circumferentially around the bore of the element so that the contacting surfaces of the packing and the element are confined to the radially outer portions of the parts.

2. A thermostat comprising a receptacle filled with an expansible fluid, a rod in said receptacle, said rod being of comparatively small cross-section relative to that of said receptacle and extending through a wall of said receptacle, a circumferentially continuous annular packing of elastic material surrounding said rod and disposed in contact with the bottom of a recess in said wall, an axially displaceable annular element in said recess in contact with said packing, the bottom of the recess and the surface of the element contacting the packing extending in planes perpendicular to the axis of the rod, a spring acting on said element to exert compressive pressure on said packing irrespective of the axial position of said rod for effecting a fluid-tight seal between said packing, said bottom and said rod, said receptacle being provided with an abutment and said spring being located between said element and said abutment, whereby compressive pressure exerted on said packing by said spring is not affected by axial movement of said rod, and a second spring being provided for retracting said rod independently of the first-mentioned spring.

3. A thermostat as set forth in claim 2 in which an adjustable spring-retaining member is threaded into the wall of said recess for adjusting the value of the compressive pressure exerted by the first-mentioned spring.

RAGNAR CARLSTEDT.

REFERENCES CITED

The following references are of record in the file of this patent:

UNITED STATES PATENTS

| Number | Name | Date |
| --- | --- | --- |
| 877,706 | Duffy | Jan. 28, 1908 |
| 1,597,254 | Vogel | Aug. 24, 1926 |
| 2,354,364 | Chapman | July 25, 1944 |

FOREIGN PATENTS

| Number | Country | Date |
| --- | --- | --- |
| 320,339 | Great Britain | Oct. 3, 1929 |
| 408,014 | Great Britain | Apr. 5, 1934 |